(12) United States Patent
Roberson et al.

(10) Patent No.: US 7,573,915 B1
(45) Date of Patent: Aug. 11, 2009

(54) METHOD AND APPARATUS FOR TRANSPORTING NETWORK MANAGEMENT INFORMATION IN A TELECOMMUNICATIONS NETWORK

(75) Inventors: Charles Scott Roberson, Sonoma, CA (US); Paul M. Elliott, Jenner, CA (US); Phu Son Le, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1228 days.

(21) Appl. No.: 09/727,905

(22) Filed: Nov. 30, 2000

Related U.S. Application Data

(60) Provisional application No. 60/199,591, filed on Apr. 25, 2000.

(51) Int. Cl.
H04B 7/212 (2006.01)
H04J 3/16 (2006.01)
H04J 3/22 (2006.01)
G06F 15/173 (2006.01)

(52) U.S. Cl. .................. 370/541; 370/347; 370/465; 709/223

(58) Field of Classification Search ......... 370/230–245, 370/352–365, 524–541, 412–499; 709/223–246
See application file for complete search history.

(56) References Cited

U.S. PATENT DOCUMENTS

| | | | |
|---|---|---|---|
| 4,967,405 A * | 10/1990 | Upp et al. ............ | 398/50 |
| 5,369,653 A | 11/1994 | Kuroda .............. | 371/67.1 |
| 5,621,721 A | 4/1997 | Vatuone ............ | 370/16 |
| 5,781,527 A * | 7/1998 | Read et al. ......... | 370/216 |
| 5,928,328 A * | 7/1999 | Komori et al. ...... | 709/223 |
| 5,963,943 A | 10/1999 | Cummins et al. .... | 707/10 |
| 6,009,075 A | 12/1999 | Roberts et al. ..... | 370/219 |
| 6,130,887 A * | 10/2000 | Dutta ............... | 370/347 |
| 6,260,062 B1 * | 7/2001 | Davis et al. ........ | 709/223 |
| 6,363,421 B2 * | 3/2002 | Barker et al. ...... | 709/223 |
| 6,370,155 B1 * | 4/2002 | Cantwell et al. .... | 370/465 |
| 6,389,036 B1 * | 5/2002 | Stewart et al. ..... | 370/466 |
| 6,393,472 B1 * | 5/2002 | Anerousis et al. ... | 709/223 |
| 6,463,040 B1 * | 10/2002 | Dutta ............... | 370/280 |
| 6,574,238 B1 * | 6/2003 | Thrysoe ............ | 370/466 |
| 6,674,771 B1 * | 1/2004 | Taniguchi .......... | 370/505 |
| 6,731,654 B1 * | 5/2004 | Champion et al. ... | 370/503 |
| 6,788,681 B1 * | 9/2004 | Hurren et al. ...... | 370/389 |
| 6,795,917 B1 * | 9/2004 | Ylonen ............. | 713/160 |
| 6,847,644 B1 * | 1/2005 | Jha ................. | 370/392 |
| 6,870,813 B1 * | 3/2005 | Raza et al. ......... | 370/238 |
| 2002/0004828 A1 * | 1/2002 | Davis et al. ........ | 709/223 |

* cited by examiner

*Primary Examiner*—Man Phan
(74) *Attorney, Agent, or Firm*—Campbell Stephenson, LLP

(57) ABSTRACT

Network management information (NMI) contained in a first set of byte locations of a received frame is relocated to a second set of byte locations of another frame. The NMI is then transported through network elements using the second set of byte locations until the NMI is to be transported to a compatible network element, which can understand the NMI. At which time, the NMI is relocated back to the first set of byte locations of frames destined for the compatible network element. The relocation of the NMI from a first set of byte locations to a second set of byte locations allows the NMI to be transparently transported through incompatible network elements.

8 Claims, 8 Drawing Sheets

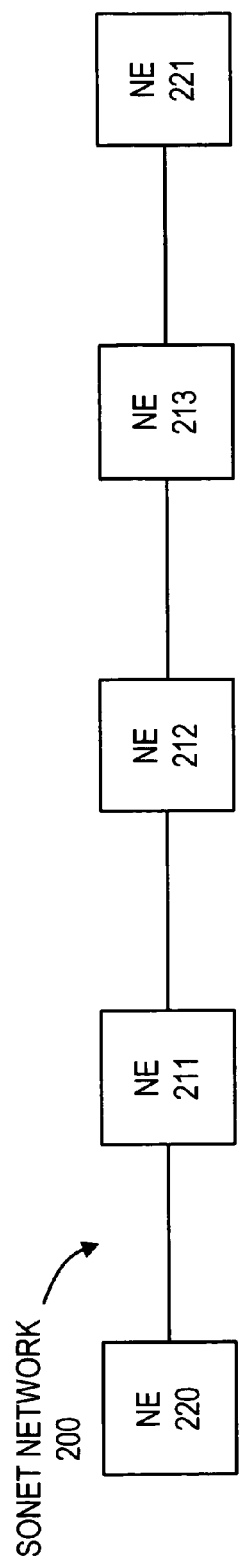
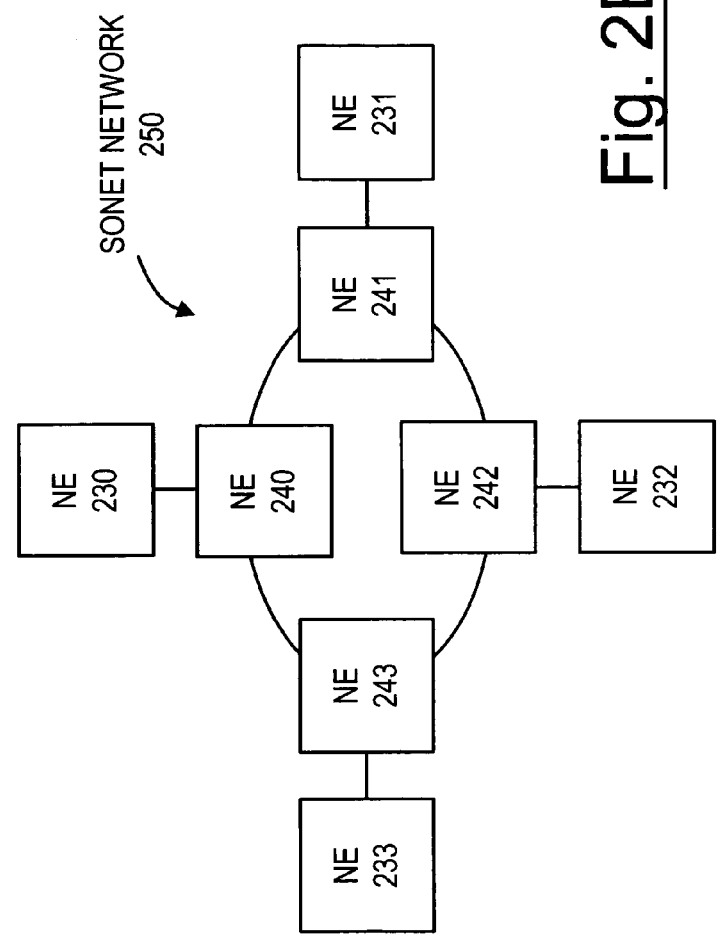

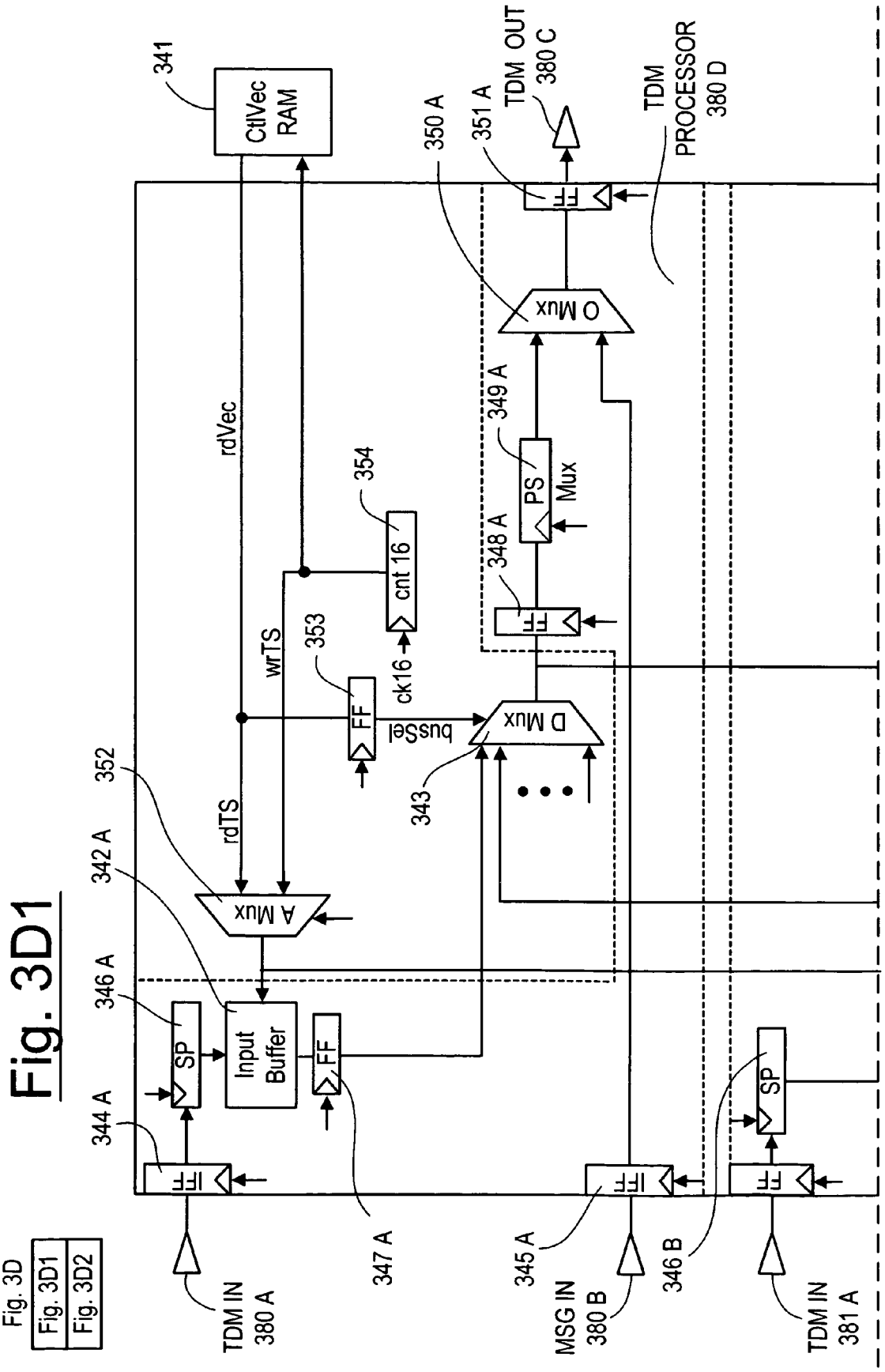
Fig. 3D1

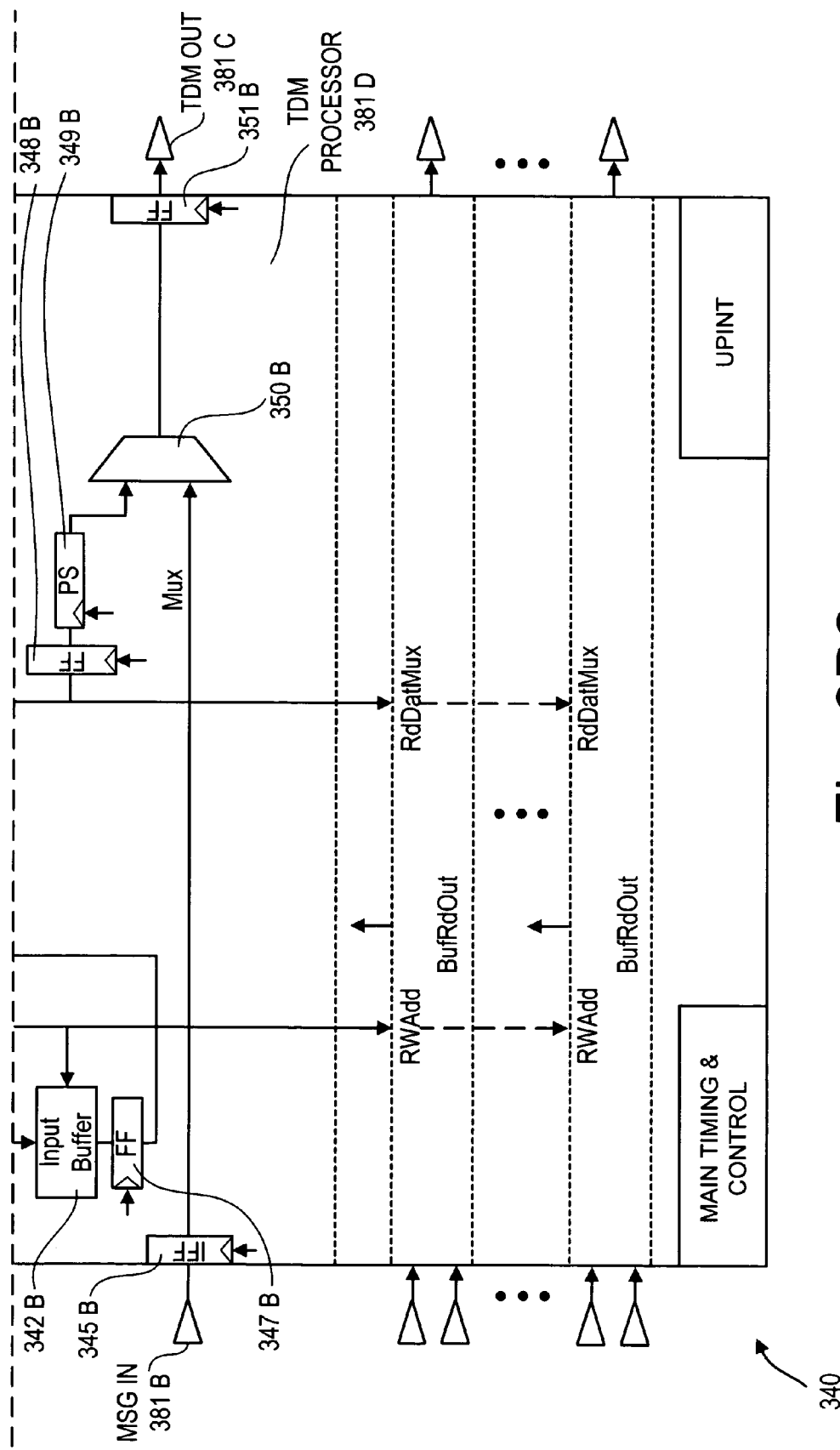
Fig. 3D2

METHOD AND APPARATUS FOR TRANSPORTING NETWORK MANAGEMENT INFORMATION IN A TELECOMMUNICATIONS NETWORK

CROSS REFERENCE TO RELATED APPLICATIONS

This application claims priority on U.S. Provisional Patent Application No. 60/199,591, "METHOD AND APPARATUS FOR TRANSPORTING NETWORK MANAGEMENT INFORMATION IN A TELECOMMUNICATIONS NETWORK", filed on Apr. 25, 2000, by Chip Roberson, Paul Elliot, and Phu Le.

This application is related to the following commonly-assigned U.S. patents: U.S. Pat. No. 6,614,785, "AUTOMATIC PROPAGATION OF CIRCUIT INFORMATION IN A COMMUNICATION NETWORK," issued on Sep. 2, 2003; U.S. Pat. No. 6,657,969, "GENERATION OF DATA USED FOR NETWORK OPERATION," issued on Dec. 2, 2003; and U.S. Pat. No. 6,587,470, "FLEXIBLE CROSS-CONNECT WITH DATA PLANE," on Jul. 1, 2003. All of the aforementioned patents are incorporated herein by reference in their entirety.

BACKGROUND OF THE INVENTION

1. Field of the Invention

The present invention generally relates to telecommunications networks and more particularly to methods and associated apparatus for transporting network management information between network elements.

2. Description of the Related Art

Network elements (also known as nodes) in a telecommunications network exchange network management information with one another using a common protocol. Common Management Information Service Element (CMISE) and Common Management Information Protocol (CMIP), for example, are known protocols for transporting and processing network management information in Synchronous Optical Network (SONET) and SONET-derived networks such as Synchronous Digital Hierarchy (SDH). CMISE and CMIP are based on Open System Interconnection (OSI) standards. Various manufacturers of SONET equipment have also implemented proprietary network management protocols.

The use of network elements utilizing different network management protocols in the same network can lead to interoperability problems. Network management information exchanged between two network elements that use incompatible protocols can be misinterpreted, yielding unpredictable results. One way of solving the interoperability problem is to use a dedicated gateway or translation device between incompatible network elements. Using a gateway, however, increases the cost and complexity of the network. Thus, a simple and cost-effective technique for transporting network management information between incompatible network elements is highly desirable.

SUMMARY OF THE INVENTION

The present invention relates to a method and associated apparatus for transporting network management information through incompatible network elements (NEs) in a telecommunications network. In accordance with the invention, a first NE transports frames of information to a second NE, which is not compatible with the first NE. The second NE relocates the network management information contained in a first set of byte locations of the frames received from the first NE to a second set of byte locations of frames destined for a third NE, which is compatible with the second NE. The third NE then relocates the network management information contained in the second set of byte locations of the frames received from the second NE to a first set of byte locations of the frames destined for a fourth NE, which is compatible with the first NE. The second set of byte locations of frames from the second NE and third NE can be thought of as a virtual tunnel which allows network management information to be transparently transported from the first NE to the fourth NE. The tunnel can be setup using a single NE or multiple compatible NEs.

In one example, the frames transported between NEs are SONET frames; the first set and second set of byte locations are data communication channels in a SONET section overhead and a SONET line overhead, respectively.

BRIEF DESCRIPTION OF THE DRAWINGS

FIGS. 2A and 2B show a schematic diagram of SONET networks in one embodiment.

FIG. 3D shows further details of the TDM cross-connect apparatus shown in FIG. 3C.

The use of the same reference numeral in different figures indicates the same or similar element.

DETAILED DESCRIPTION

SONET networks, in general, are well known and are described in the American National Standards Institute ("ANSI") documents ANSI T1.105, ANSI T1.105.01, ANSI T1.105.02, ANSI T1.105.03, ANSI T1.105.04, ANSI T1.105.05, ANSI T1.105.06, ANSI T1.105.07, ANSI T1.105.08, and ANSI T1.105.09, all of which are available from ANSI (Internet web site "www.ansi.org"); see also, W. J. Goralski, "SONET: A guide to Synchronous Optical Networks," McGraw-Hill 1997. All of the aforementioned SONET documents are incorporated herein by reference in their entirety.

Figure 1:
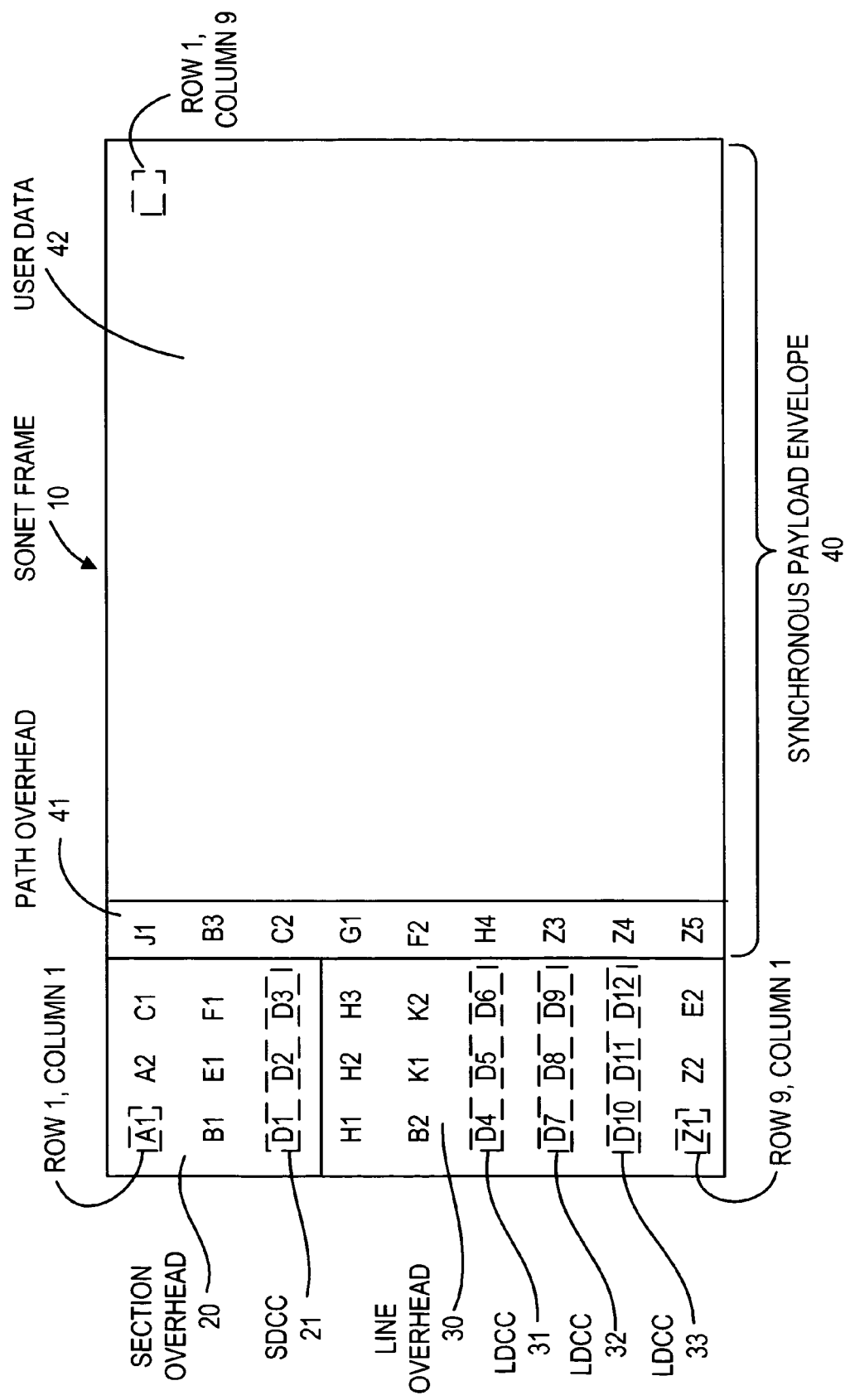
FIG. 1 shows a pictorial representation of a conventional SONET frame.

In FIG. 1, a conventional SONET frame 10 (e.g., STS-1) is pictorially shown as an array of byte locations having 9 rows and 90 columns. SONET frame 10 is divided into four sections namely section overhead 20, line overhead 30, path overhead 41, and user data 42. Section overhead 20, line overhead 30, and path overhead 41 carry operational, administration, maintenance, and provisioning (OAM&P) information while user data 42 carry the data to be transported. Path overhead 41 and user data 42 compose a synchronous payload envelope (SPE) 40.

The byte locations composing section overhead 20 are in rows 1 to 3, columns 1 to 3 (i.e., bytes A1, A2, C1, B1, . . . D2, and D3) of SONET frame 10. Byte locations D1, D2, and D3 of section overhead 20, collectively denoted in FIG. 1 as "SDCC 21", are commonly known as section data communications channel (SDCC) bytes. Typically, SDCC 21 is used by network elements to carry network management information in accordance with a network management protocol (hereinafter "protocol"). The use of incompatible protocols by different equipment manufacturers, however, has created interoperability problems. For instance, a network element using an OSI-based protocol will not be able to read network management information from a network element using a Transport Control Protocol/Internet Protocol (TCP/IP) based protocol. Worst, network management information from an incompatible network element can get misinterpreted and thereby yield unpredictable results.

In the present invention, a virtual tunnel is created through compatible network elements to allow network management information from an incompatible network element to transparently pass through the tunnel. FIG. 2A shows a schematic diagram of a SONET network 200 in one embodiment of the invention. In network 200, network elements (NEs) 220 and 221 use an OSI-based protocol while NEs 211, 212, and 213 use a TCP/IP-based protocol. A tunnel is created through NEs 211, 212, and 213 to allow network management information from NE 220 to reach NE 221 without getting processed, and misinterpreted, by NEs 211, 212, and 213. In one embodiment, the tunnel is created by first relocating the network management information in SDCC 21 of SONET frames received by NE 211 from NE 220 into another group of byte locations of SONET frames destined for NE 212. As shown in FIG. 1, the byte locations composing line overhead 30 are in rows 4 to 9, columns 1 to 3 (i.e., byte locations H1, H2, H3, B2, . . . Z2, and E2) of SONET frame 10. Byte locations D4 to D12, also known as line data communications channels (LDCCs), are not defined in existing SONET standards. Thus, byte locations D4, D5, and D6, collectively denoted as LDCC 31, can be used to carry the contents of SDCC 21 of NE 220 (hereinafter "foreign SDCC"). In NE 211, the foreign SDCC is relocated from SDCC 31 of SONET frames received from NE 220 to LDCC 31 of SONET frames destined for NE 212. NE 211 also moves its own network management information into the SDCC 21 of SONET frames destined for NE 212. Because NE 212 is compatible with NE 211, NE 212 processes the SDCC 21 of SONET frames from NE 211. The foreign SDCC now located in LDCC 31 of SONET frames from NE 211 is simply copied over to the LDCC 31 of SONET frames destined for NE 213. NE 212 moves its own network management information into SDCC 21, if appropriate, for all frames destined for NE 213. NE 213 is compatible with NE 212 and thus processes the received SDCC 21 without processing LDCC 31. Because NE 221 is compatible with NE 220, and not with NE 213, NE 213 relocates the foreign SDCC from LDCC 31 back to SDCC 31 for all SONET frames destined for NE 221. The LDCC 31 of SONET frames transported from NE 211 to NE 213 can be thought of as a virtual tunnel which allows incompatible network management information, such as foreign SDCCs, to transparently pass through. The above technique can also be used to transmit network management information from NE 221 to NE 220. Other undefined byte locations of a SONET frame can also be used as a tunnel including LDCC 32 (byte locations D7, D8, and D9) and LDCC 33 (byte locations D10, D11, and D12). In the prior art, information carried in the section overhead and line overhead of a SONET frame is only relevant to a receiving network element and is thus consumed at that network element. In the present invention, information in the section overhead and line overhead can be passed to another network element as part of a virtual tunnel.

Figure 2C:
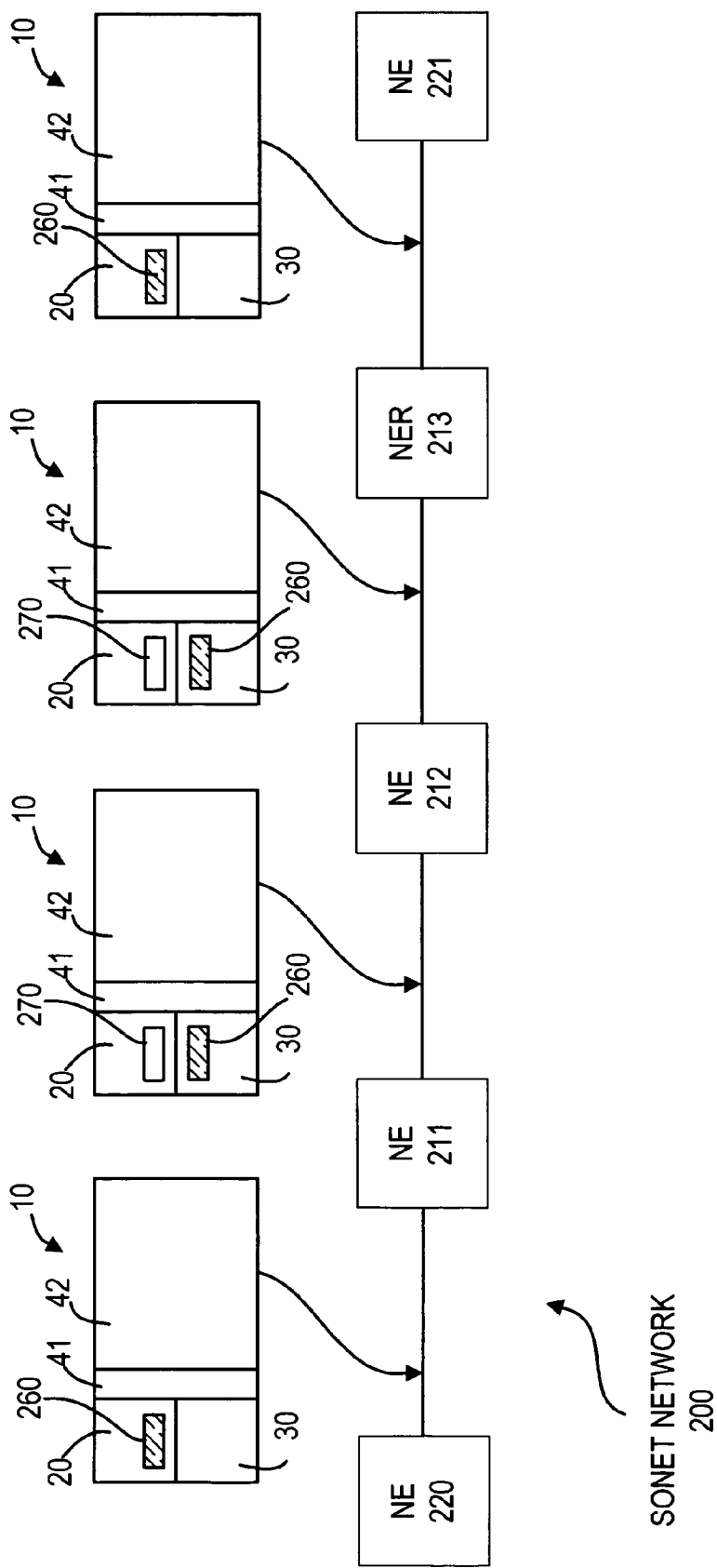
FIG. 2C shows a pictorial representation of the transportation of network management information through a tunnel in the network shown in FIG. 2A.

FIG. 2C pictorially illustrates the transportation of OSI-based network management information 260 (NMI 260) through a tunnel between NE 211 and NE 213. As shown in FIG. 2C, SONET frames 10 from NE 220 to NE 211 carry NMI 260 in section overhead 20 (e.g., in SDCC 21). SONET frames 10 from NE 211 to NE 212 carry NMI 260 in line overhead 30 (e.g., in LDCC 31) and TCP/IP-based network management information 270 (NMI 270) in section overhead 20. SONET frames 10 from NE 212 to NE 213 carry NMI 260 in line overhead 30 and NMI 270 in section overhead 20. SONET frames 10 from NE 213 to NE 221 carry NMI 260 back in section overhead 20. Thus, NMI 260 is transported from NE 220 to NE 221 without being processed in NE 211, NE 212, and NE 213.

An algorithm for the above described tunneling technique can be summarized as follows:

For all SONET frames received from an incompatible network element and destined for a compatible network element: (a) transfer the contents of SDCC 21 to LDCC 31 and (b) use SDCC 21 to carry compatible network management information.

For all SONET frames received from a compatible network element and destined for a compatible network element: (a) process the contents of SDCC 21, (b) update SDCC 21 if appropriate, and (c) do not process LDCC 31.

For all SONET frames received from a compatible network element and destined for an incompatible network element: (a) process the contents of SDCC 21 and (b) transfer the contents of LDCC 31 to SDCC 21.

For all SONET frames received from an incompatible network element and destined for an incompatible network element: (a) do not process SDCC 21 and (b) do not process LDCC 31.

In one embodiment, the tunnel is configured manually by a human operator who, by inspection, knows the topology of the network and which network elements are not compatible. In provisioning communications lines (also known as "circuits") in SONET network 200, for example, the operator can indicate in the provisioning software that:

(a) in NE 211: an incoming SDCC 21 from NE 220 is to be relocated to an LDCC 31 destined for NE 212, an incoming LDCC 31 from NE 212 is to be relocated to an SDCC 21 destined for NE 220;

(b) in NE 212: an incoming LDCC 31 from NE 211 is to be passed to an LDCC 31 destined for NE 213, an incoming LDCC 31 from NE 213 is to be passed to an LDCC 31 destined for NE 211;

(c) in NE 213: an incoming LDCC 31 from NE 212 is to be relocated to an SDCC 21 destined for NE 221, an incoming SDCC 21 from NE 221 is to be relocated to an LDCC 31 destined for NE 212.

Techniques for provisioning communications lines in SONET networks are well known.

The tunneling technique of the present invention can be used in a variety of network topologies. FIG. 2B shows a schematic diagram of a SONET network 250 in one embodiment of the invention. In network 250, NEs 230-233 use one protocol to transport and process network management information while NEs 240-243 use a different protocol. To prevent interoperability problems arising from the use of different protocols, a tunnel is created between NEs 240 and 241, between NEs 241 and 242, between NEs 242 and 243, and between NEs 243 and 240 (a total of 4 tunnels in network 250). For example, network 250 can be provisioned as follows.

Tunnel Between NE 240 and NE 241
(a) In NE 240: an SDCC 21 from NE 230 is to be relocated to an LDCC 31 destined for NE 241, an LDCC 31 from NE 241 is to be relocated to an SDCC 21 destined for NE 230.
(b) In NE 241: an SDCC 21 from NE 231 is to be relocated to an LDCC 31 destined for NE 240, an LDCC 31 from NE 240 is to be relocated to an SDCC 21 destined for NE 231.

Tunnel Between NE 241 and NE 242
(a) In NE 241: an SDCC 21 from NE 231 is to be relocated to an LDCC 31 destined for NE 242, an LDCC 31 from NE 242 is to be relocated to an SDCC 21 destined for NE 231.
(b) In NE 242: an SDCC 21 from NE 232 is to be relocated to an LDCC 31 destined for NE 241, an LDCC 31 from NE 241 is to be relocated to an SDCC 21 destined for NE 232.

Tunnel Between NE 242 and NE 243
(a) In NE 242: an SDCC 21 from NE 232 is to be relocated to an LDCC 31 destined for NE 243, an LDCC 31 from NE 243 is to be relocated to an SDCC 21 destined for NE 232.
(b) In NE 243: an SDCC 21 from NE 233 is to be relocated to an LDCC 31 destined for NE 242, an LDCC 31 from NE 242 is to be relocated to an SDCC 21 destined for NE 233.

Tunnel Between NE 243 and NE 240
(a) In NE 243: an SDCC 21 from NE 233 is to be relocated to an LDCC 31 destined for NE 240, an LDCC 31 from NE 240 is to be relocated to an SDCC 21 destined for NE 233.
(b) In NE 240: an SDCC 21 from NE 230 is to be relocated to an LDCC 31 destined for NE 243, an LDCC 31 from NE 243 is to be relocated to an SDCC 21 destined for NE 230.

The use of tunnels in network 250 allows NEs 230-233 to exchange network management information without disrupting the exchange of network management information among NEs 240-243.

Figure 3A:
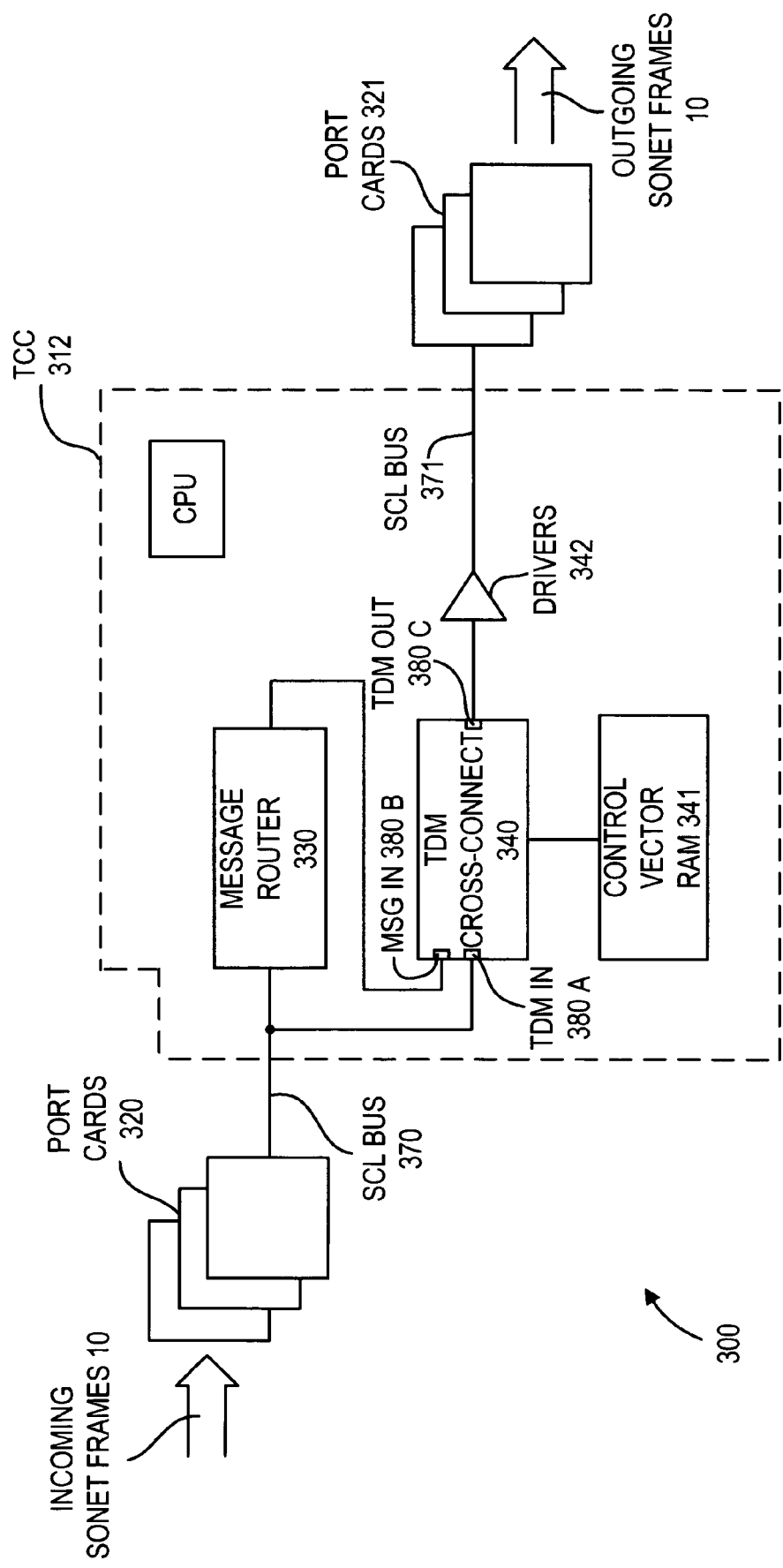
FIG. 3A shows a schematic diagram of relevant portions of a network element in one embodiment.
Figure 3B:
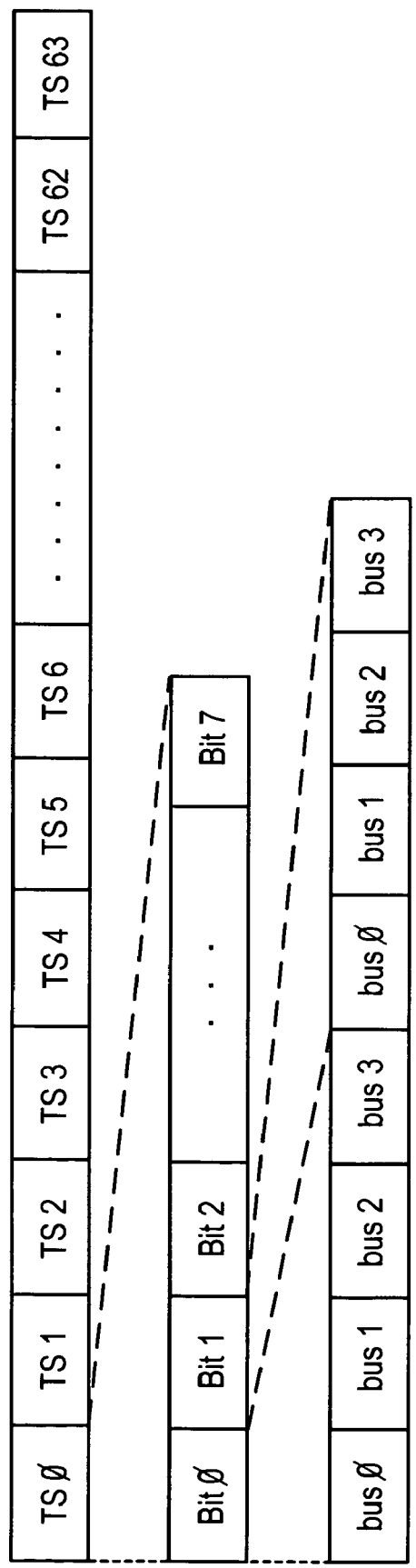
FIG. 3B shows a pictorial representation of a time division multiplex (TDM) data in one of the data paths used in the network element shown in FIG. 3A.

FIG. 3A shows a schematic diagram of a network element 300 (NE 300) in one embodiment of the invention. Components that are well known and not necessary to the understanding of the invention have been omitted in the interest of clarity. NE 300 can be used, for example, in place of NEs 211-213 in SONET network 200 or in place of NEs 240-243 in SONET network 250. NE 300 includes multiple port cards 320 and 321 (also known as trunk/drop cards) for receiving and transmitting SONET frames 10. Each of port cards 320 and 321 has multiple ports which are also known as line interfaces. Incoming SONET frames 10 received by a port in port cards 320 are sent to a Timing, Communication, and Control (TCC) processor 312 over a System Communications Link (SCL) bus 370. While there are multiple SCL buses in NE 300, one for each port, only SCL bus 370 and 371 are shown for clarity. In one example, each SCL bus is a time division multiplexed (TDM) bus synchronized at 16 Mbits/s (i.e., 16 Mega-Bits per second). Time division multiplexing, in general, is well known. FIG. 3B shows a pictorial representation of the information carried in an SCL bus. Each SCL bus is divided into four 4 Mbits/s logical buses, which are BUS0, BUS1, BUS2, and BUS3. Each logical bus has 64 time slots (TS0, TS1, ... TS63) and is frame-aligned using an 8 KHz framing clock. That is, a TS0 (or TS1 or TS2 ... ) arrives every 125 μs. Each time slot consists of a byte (8 bits) of data and can be bit-interleaved. Thus, each logical bus is essentially a Digital Signal-0 (DS-0) channel.

In one example, SDCC 21, LDCC 31, LDCC 32, and LDCC 33 are mapped in logical BUS0 of SCL bus 370 as follows:

Mapping in Logical Bus0
TS16—Contains Byte D1 of SDCC 21
TS20—Contains Byte D2 of SDCC 21
TS24—Contains Byte D3 of SDCC 21
TS28—Contains Byte D4 of LDCC 31
TS32—Contains Byte D5 of LDCC 31
TS36—Contains Byte D6 of LDCC 31
TS40—Contains Byte D7 of LDCC 32
TS44—Contains Byte D8 of LDCC 32
TS48—Contains Byte D9 of LDCC 32
TS52—Contains Byte D10 of LDCC 33
TS56—Contains Byte D11 of LDCC 33
TS60—Contains Byte D12 of LDCC 33

Other time slots in logical buses BUS0, BUS1, BUS2, and BUS3 carry other types of information such as messages between cards (e.g., card status), alarms, and other bytes of a SONET frame.

Referring back to FIG. 3A, time slots in SCL bus 370 are received by a message router 330 and a time division multiplex cross-connect 340 (TDMXConn 340). Message router 330 extracts and routes messages carried in logical BUS2 of SCL 370. TDMXConn 340 receives time slots from SCL bus 370 on terminal TDM IN 380A and relocates (i.e., cross-connects) the time slots to any time slot of any logical bus of any SCL bus. TDMXConn 340 is essentially a DS-0 cross-connect. For example, TDMXConn 340 can relocate the contents of TS16, TS20, and TS24 (i.e., SDCC 21) of logical BUS0 of SCL bus 370 to TS28, TS32, and TS36 (i.e., LDCC 31), respectively, of logical BUS0 of SCL bus 371, thereby creating a tunnel through NE 300. Terminal MSG IN 380B of TDMXConn 340 receives the messages processed by message router 330 for insertion into a time slot of SCL bus 371. The output of TDMXConn 340 comes out of a terminal TDM 380C and is transmitted onto SCL bus 371 through drivers 342. A control vector random access memory 341 (CtlVec RAM 341) controls the cross-connection of time slots in TDXConn 340.

Figure 3C:
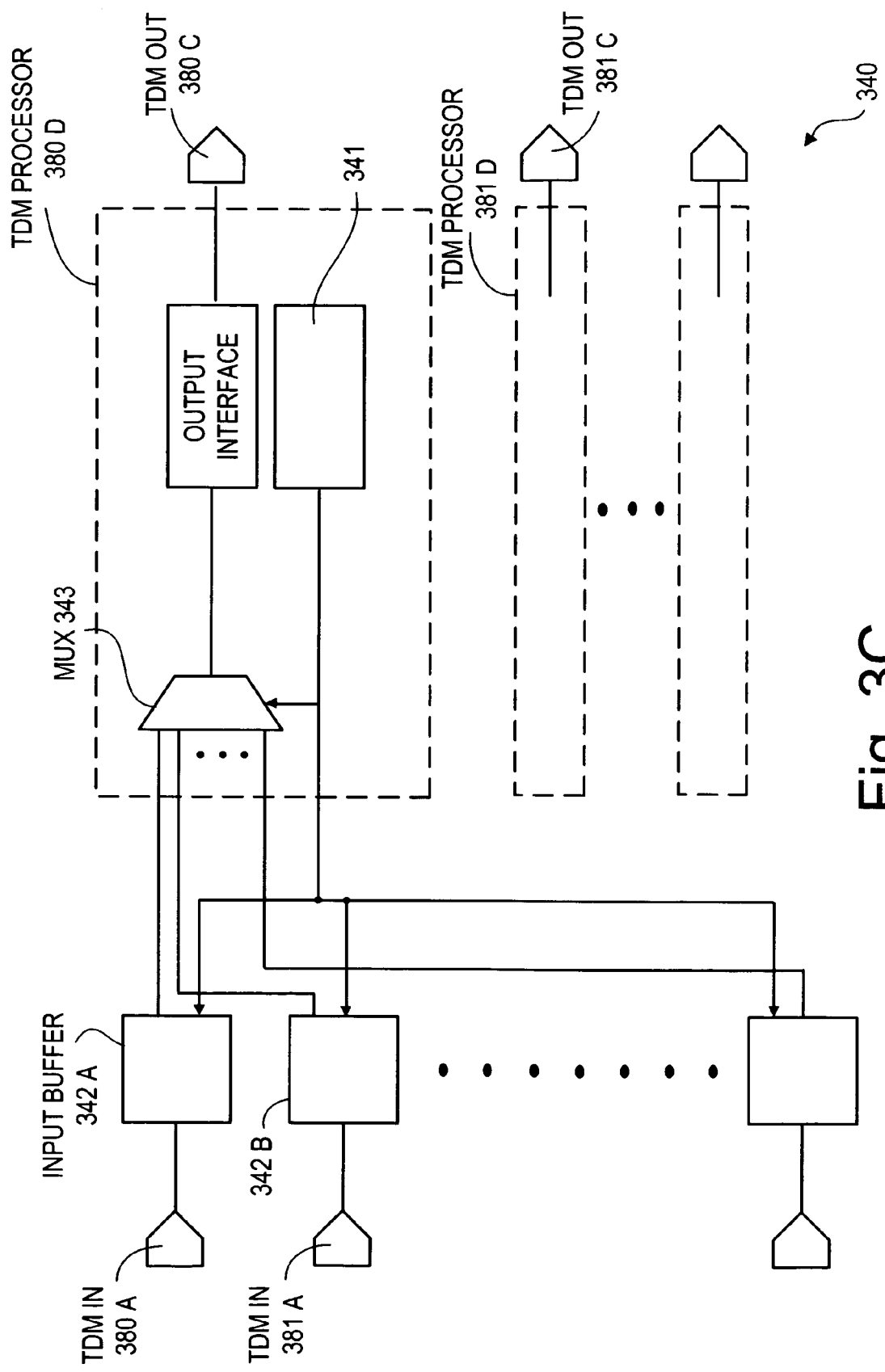
FIG. 3C shows a schematic diagram of a TDM cross-connect apparatus in one embodiment.

FIG. 3C shows a schematic diagram of TDMXConn 340. TDMXConn 340 uses a well known TDM cross-connect technique known as Sequential-Write/Random-Read. In this technique, incoming time slots are written into an input buffer in the order the time slots are received (sequential write). The time slots are then read in any order (random read) for insertion into any outgoing time slots. Referring to FIG. 3C, TDMXConn 340 has multiple TDM processors (TDM processors 380D, 381D, ... ), one for each port, for cross-connecting the time slots of multiple SCL buses. TDM processor 380D reads a time slot from any of the input buffer RAMs(e.g., input buffer 342A) and multiplexes the time slot with another time slot (e.g., another time slot from input buffer 342B) using MUX 343 for output to outgoing time slots of SCL bus 371 (see FIG. 3A) on terminal TDM OUT 380C. Similarly, TDM processor 381D reads a time slot from any input buffer RAM, multiplexes the time slot with another time slot from the same or different input buffer RAM, and then outputs the time slot and the other time slot as time slots on an SCL bus on terminal TDM OUT 381C.

FIG. 3D shows further details of TDMXConn 340 in one embodiment of the invention. TDMXConn 340 is synchronized with the 16 Mbits/s clock of the SCL buses. Incoming time slots on terminal TDM IN 380A are reclocked at input flip-flop 344A (IFF 344A) and then shifted into a serial to parallel register 346A (SP 346A). Whenever an 8-bit time slot data becomes available in SP 346A, that time slot data is written into input buffer 342A, which can be a 16 K×8 dual port RAM. In one embodiment, a time slot from SP 346A is written into input buffer 342A once for every 128 clock cycles of the 16 Mbits/s clock. The next 127 clock cycles of the 16 Mbits/s clock are then used for reading time slots from the input buffers (input buffers 342A, 342B, ... ). Time slots read from input buffer 342A are first buffered in a flip-flop 347A (FF 347A) before being presented at the input of a data multiplexer 343 (D-MUX 343). D-MUX 343, which can be a multi-stage pipelined multiplexer, multiplexes the time slots received from any of the input buffers for output into any of the outgoing time slots on any of the output terminals (i.e., TDM OUTs 380C, 381C, ... ). For example, a time slot read from input buffer 342A can be written into FF 348A through D-MUX 343. The time slot in FF 348A is written into a parallel to serial register 349A (PS 349A) and then serially read out to an input of an output multiplexer 350A (O-MUX 350A). O-MUX 350A multiplexes the time slot from input buffer 342A with a time slot from message router 330, received on terminal MSG IN 380B, for output onto the outgoing time slots on terminal TDM OUT 380C via flip-flop 351A (FF 351A).

In one example, CtlVec RAM 341 is implemented using a 16K×16 RAM. The addresses of CtlVec RAM 341 contain vectors for selecting a specific port, logical bus, and time slot written on any of the input buffers. A vector points to the input buffer address which contains a selected time slot of a logical bus of a particular port. Table 1 shows the contents of CtlVec RAM 341 in one example.

TABLE 1

| Address | Contents | Usage |
|---|---|---|
| 0 | PORT0, BUS0, TS0 | Control vector for port 0, logical BUS0, time slot TS0 |
| 1 | PORT0, BUS0, TS1 | Control vector for port 0, logical BUS0, time slot TS1 |
| ... | ... | ... |
| 63 | PORT0, BUS0, TS63 | Control vector for port 0, logical BUS0, time slot TS63 |
| 64 | PORT0, BUS1, TS0 | Control vector for port 0, logical BUS1, time slot TS0 |
| ... | ... | ... |
| 256 | PORT1, BUS0, TS0 | Control vector for port 1, logical BUS0, time slot TS0 |
| ... | ... | ... |
| 16384 | PORTm, BUSn, Tsy | Control vector for port m, logical BUSn, time slot TSy |

In Table 1, port 0 refers to a port in port cards 320 whose SCL bus is connected to terminal TDM IN 380A (similarly, port 1 refers to a port in port cards 320 whose SCL bus is connected to terminal TDM IN 381A etc.). The format of the 16-bit contents of CtlVec RAM 341 in one example is shown in Table 2.

TABLE 2

| Bit | Usage When Bit 14 is a "0" | Usage When Bit 14 is a "1" |
|---|---|---|
| 15 | Not Used | Not Used |
| 14 | 0 | 1 |
| 13-8 | Selected Port | Not used |
| 7-6 | Selected Logical Bus | Transmit Byte |
| 5-0 | Selected Time slot | |

As shown in Table 2, when bit 14 of CtlVec RAM 341 is a "0," bits 13-8, 7-6, and 5-0 indicate the selected port, selected logical bus, and selected time slot, respectively, to be read out of an input buffer. When bit 14 is a "1," the bits of CtlVec RAM 341 do not represent a vector for reading a time slot from an input buffer. Rather, bits 7-6 contain a transmit data byte which will be inserted into a next outgoing time slot. Thus, besides the cability to cross-connect time slots, TDMXConn 340 can also insert a programmed byte into an outgoing time slot. Bit 15 of CtlVec RAM 341 is not used in this particular example.

CtlVec RAM 341 and counter 354 (cnt16 354) form a microprogrammed algorithmic state machine. Cnt16 354 sequences the reading of vectors from CtlVec RAM 341 and provides control information for writing a time slot on any of the input buffers. Vectors from CtlVec RAM 341 and control information from cnt16 354 are presented at the input buffers through an address multiplexer 352 (A-MUX 352). A vector presented at an input buffer is also used, at the same time, to select an input on D-MUX 343 such that the time slot read from the input buffer is sent to the appropriate outgoing time slot. Note that because the time slots are time division multiplexed on a synchronous bus, the contents of an incoming time slot can be relocated to an outgoing time slot by using the vectors from CtlVec RAM 341 to read the incoming time slot out of an input buffer and through D-MUX 343 at the appropriate time. For example, the contents of an incoming time slot TS16 of logical bus 0 of the port connected to terminal TDM 9 IN 380A can be relocated to an outgoing time slot TS28 of logical BUS0 of the port connected to terminal TDM OUT 381C by reading the incoming time slot TS16 out of input buffer 342A at the time outgoing time slot TS28 is next available for output on terminal TDM OUT 381C.

Vectors are conventionally downloaded to CtlVec RAM 341 after a provisioning change to reflect the cross-connections of the time slots. For example, the vectors can be downloaded after the user has provisioned to relocate the SDCCs 21 of a port connected to terminal TDM IN 380A to LDCCs 31 of another port connected to terminal TDM OUT 381C to create a tunnel. Of course, the vectors can also be changed and downloaded to CtlVec RAM 341 to reflect SONET protection switching.

While the invention is described using SDCC 21 and LDCC 31 as an example, the invention is not so limited and may use other byte locations in a SONET frame. Further, the invention is not limited to SONET networks as any telecommunications network may benefit from the disclosed tunneling technique. The invention is set forth in the following claims.

What is claimed is:

1. A method comprising:
   receiving a plurality of time slots, wherein
      said time slots comprise a first frame and a second frame,
      said second frame is received subsequently to said first frame, and
      said first frame and said second frame are time-division multiplexed frames;
   relocating existing network management information of said second frame from a set of byte locations of said second frame to another set of byte locations of said second frame;
   relocating network management information from a first set of byte locations of said first frame to said set of byte locations of said second frame;
   cross-connecting said time slot;
   selecting at least one of said time slots;
   receiving a plurality of incoming time slots;
   sequentially writing said incoming time slots into a plurality of input buffers;

randomly reading a plurality of outgoing time slots from said input buffers; and outputting said outgoing time slots.

2. The method of claim 1, further comprising:

extracting said network management information; and routing said network management information.

3. The method of claim 2, wherein said cross-connecting comprises said selecting said at least one of said time slots.

4. An apparatus comprising:

means for receiving a plurality of time slots, wherein
said time slots comprise a first frame and a second frame,
said second frame is received subsequently to said first frame, and
said first frame and said second frame are time-division multiplexed frames;

means for relocating existing network management information of said second frame from a set of byte locations of said second frame to another set of byte locations of said second frame;

means for relocating network management information from a first set of byte locations of said first frame to said set of byte locations of said second frame;

means for cross-connecting said time slots;

means for selecting at least one of said time slots;

means for receiving a plurality of incoming time slots;

means for sequentially writing said incoming time slots into a plurality of input buffers;

means for randomly reading a plurality of outgoing time slots from said input buffers; and means for outputting said outgoing time slots.

5. The apparatus of claim 4, further comprising:

means for extracting said network management information; and means for routing said network management information.

6. The apparatus of claim 5, wherein said means for cross-connecting comprises said means for selecting.

7. A program on a computer readable medium product comprising:

a first set of instructions, executable on a computer system, configured to receive a plurality of time slots, wherein
said time slots comprise a first frame and a second frame,
said second frame is received subsequently to said first frame, and
said first frame and said second frame are time-division multiplexed frames;

a second set of instructions, executable on said computer system, configured to relocate network management information from a first set of byte locations of said first frame to said set of byte locations of said second frame;

a third set of instructions, executable on said computer system, configured to cross-connect said time slots;

a fourth set of instructions, executable on said computer system, configured to select at least one of said time slots;

a fifth set of instructions, executable on said computer system, configured to receive a plurality of incoming time slots;

a sixth set of instructions, executable on said computer system, configured to sequentially write said incoming time slots into a plurality of input buffers;

a seventh set of instructions, executable on said computer system, configured to randomly read a plurality of outgoing time slots from said input buffers;

an eighth set of instructions, executable on said computer system, configured to output said outgoing time slots; and computer readable storage media, wherein said computer program product is encoded in said computer readable storage media.

8. The program of claim 7, further comprising:

a ninth set of instructions, executable on said computer system, configured to extract said network management information; and a tenth set of instructions, executable on said computer system, configured to select at least one of said time slots.

* * * * *